3,202,511
PHOTOGRAPHIC LAYERS SUITABLE FOR THE
SILVER DYESTUFF BLEACHING PROCESS
Rudolf Mory, Dornach, and Helmut Boehl, Bottmingen,
Switzerland, assignors to Ciba Limited, Basel, Switzerland, a company of Switzerland
No Drawing. Filed Feb. 1, 1962, Ser. No. 170,495
Claims priority, application Switzerland, Feb. 15, 1961,
1,808/61
11 Claims. (Cl. 96—99)

The silver dyestuff bleaching process for the production of color photographs depends on the fact that there is a wide range of azo-dyestuffs with which the layer-forming materials, especially gelatine, can be colored, and which can be bleached in the layer to an extent that depends on the quantity of image silver locally present by the action of a suitable bleaching bath. The process involves a reduction reaction which is controlled by the image silver and in which the azo-bridges are destroyed.

Up to now, only water-soluble azo-dyestuffs have been used for the silver dyestuff bleaching process, as the water-insoluble azo-dyestuffs, sometimes called azo-pigments, generally do not undergo sufficient reduction by the image silver. To prevent diffusion of the water-soluble dyestuffs into adjacent layers, there have been used, for example, precipitating agents or dyestuffs of high molecular weight or dyestuffs containing alkyl radicals of high molecular weight.

The present invention is based on the unexpected observation that complex metal compounds of azo-pigments not only possess a very good resistance to diffusion, but can also be bleached well in photographic layers, such as gelatine, although they are completely insoluble in water.

Accordingly the invention provides photographic layers suitable for the silver dyestuff bleaching process, which contain at least one complex metal compound of an azo-dyestuff which is free from acid groups imparting solubility in water.

Acid groups imparting solubility in water are sulfonic acid groups and carboxylic acid groups, with the exception of carboxylic acid groups that take part in the formation of complexes and therefore cannot impart solubility in water. The dyestuffs preferably contain only one azo group. As complex-forming metals there may be mentioned chromium, cobalt, nickel and copper. The complex metal compounds may contain one molecule of dyestuff bound in complex union to one atom of metal (1:1-complexes) or two molecules of dyestuff bound in complex union to one atom of metal (1:2-complexes). In the latter case two molecules of the same dyestuff or one molecule each of two different dyestuffs may be bound to the same metal atom.

There may be used, for example, metal complexes of azo-dyestuffs of the formula:

(1) 

in which $R_1$ represents the radial of a diazo-component, $R_2$ the radical of a coupling component, and X and Y represent substituents bound in positions vicinal to the azo group and capable of forming metal complexes. These substituents may be, for example, hydroxyl, amino, methoxy, carboxy or carboxy-methoxy groups (—O—CH$_2$—COOH)

There may be mentioned more especially the ortho-carboxy-ortho'-hydroxy-azo-grouping, the ortho-hydroxy-ortho'-amino-azo-grouping and particularly the ortho:ortho'-dihydroxy-azo-grouping.

Thus, there are obtained by coupling an ortho-hydroxy or ortho-carboxy-diazo-compound with coupling component capable of coupling in a position vicinal to a hydroxyl group, azo-dyestuffs of the formula:

(2) 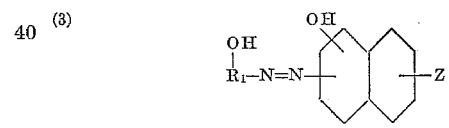

in which $R_1$ represents the radical of a diazo component, $R_2$ represents the radical of a coupling component, and $n$ is the whole number 1 or 2, and in which the two complex-forming groups, —(CO)$_{n-1}$OH and —OH, are each bound in a position vicinal to the azo group; and the complex metal compounds of these dyestuffs, which contain no groups imparting solubility in water, apart from a carboxylic acid group vicinal to the azo group, are useful as dyestuffs in photographic layers of the invention.

The diazo-components and the coupling components may contain further substituents, for example, alkyl groups such as methyl, or alkoxy groups such as methoxy, halogen atoms such as chlorine or bromine, alkyl or aralkyl sulfone groups, such as the methyl-sulfone or benzyl-sulfone group, or acid amide groups which are derived from sulfonic acids or carboxylic acids and may contain substituents at the nitrogen atom, for example, one or two alkyl or hydroxyalkyl groups, such as methyl, ethyl, hydroxyethyl, in addition to a hydrogen atom or another such group, or a phenyl radical or substituents may form with the nitrogen atom a heterocyclic ring, for example, a morpholine ring.

The diazo-components may be amines of the naphthalene series or preferably of the benzene series. As coupling components there may be mentioned more especially 5-pyrazolones and hydroxy naphthalenes capable of coupling in a position vicinal to a hydroxyl group (which may be present in form of an enolizable ketomethylene group), and also aminonaphthalene capable of coupling in a position vicinal to an amino group.

There may be mentioned, for example, complex metal compounds of monoazo-dyestuffs of the formula:

(3) 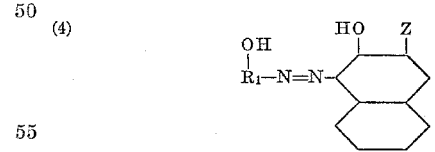

in $R_1$ represents a benzene radical, and Z represents an acid amide group, and in which the hydroxyl groups are vicinal to the azo group. The complex metal compounds of monoazo dyestuffs of the formula below deserve particular attention:

(4) 

in which $R_1$ represents a benzene radical, and Z a carboxylic acid amide group; and advantageously monoazo dyestuffs of the formula:

(5) 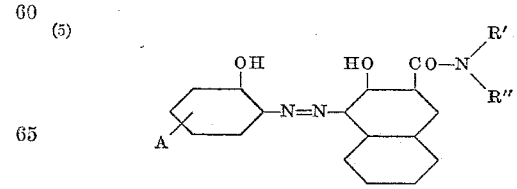

in which A represents one of the above mentioned substituents, R' represents a hydrogen atom, an alkyl group, an aryl radical (for example, phenyl or naphthyl) or a cycloalkyl radical (for example, cyclohexyl), and R" represents a hydrogen atom or an alkyl group, or the group

represents a heterocyclic radical, for example, a morpholine, piperidine or pyrrolidine radical which is bound at a ring nitrogen atom to the —CO— group.

A further group of suitable metal complexes consists of metal compounds of monoazo-dyestuffs which are free from groups imparting solubility in water and correspond to the formula (6) 

in which $R_1$ represents a benzene or naphthalene radical bound to the azo group in a position vicinal to the group

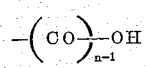

and Py represents the radical of a 5-pyrazolone bound to the azo group in the 4-position, and $n$ is the whole number 1 or 2.

The monoazo-dyestuffs of the Formula 6 can be obtained by coupling a diazotized ortho-hydroxy- or ortho-carboxy-amino-benzene or ortho-hydroxy- or ortho-carboxy- amino naphthalene with a pyrazolone, preferably with a 1-phenyl- or 1-naphthyl-3-methyl-5-pyrazolone which may be substituted in the aryl radical.

Some of the complex metal compounds to be used in the invention, and the azo-pigments from which they are made, are known. The metal compounds and the metal-free azo-pigments used for their production can be obtained by methods in themselves known.

By suitable selecting the components and the complex forming metals a large number of metal complexes can be made whose tints are suitable for photographic purposes. Thus, for example, in some cases valuable yellow metal complexes can be obtained by using pyrazolones as coupling components.

By using hydroxy-aryl or amino-aryl compounds as coupling components metal complexes having deeper tints, such as purple, blue and green, can be obtained.

For the production of photographic layers suitable for the silver dyestuff bleaching process the metal complex must be incorporated in a suitable layer-forming material, preferably gelatine, in such manner that it is present in the material in a uniform fine state of division, advantageously in a particle size less than $0.5\mu$. This result, namely a state of fine division such as to ensure that the layer is transparent, can be achieved in various ways:

(A) If the complex metal compound is soluble in an organic solvent which is immiscible or preferably miscible with water, a solution of the metal compound in such a solvent can be mixed with a solution of gelatine, if necessary, with the use of a wetting agent and/or a dispersing agent.

(B) The complex metal compound is brought by grinding in a suitable known apparatus, advantageously in the presence of water and a wetting agent and/or dispersing agent, into the desired state of fine division such that in a thin layer it appears to be transparent, and is then mixed with the gelatine solution.

(C) The metal-free azo-pigment is added to the gelatine in the form of a water-soluble salt (enolate), for example, an alkali metal salt, and the dyestuff is subsequently metallized in the layer.

Treatment with a metallizing agent in the layer may be necessary even in the case of metallized dyestuffs. Thus, when bleaching is carried out in one of the usual strong mineral acid baths, partial demetalization may take place. This can be remedied by a short after-treatment with a metallizing agent in a weakly acid to alkaline medium.

Water-soluble heavy metal complexes having the constitution defined above possess surprisingly good properties as layer dyestuffs. As stated above they can be bleached well by the usual methods of carrying out the silver dyestuff bleaching process. By suitable methods, for example, as described under (A) to (C), they can easily be incorporated in the layer in the desired state of fine division giving the necessary transparency.

Their resistance to diffusion is usually very good, so that there is no necessity to add agents that check diffusion. Finally some of the metal complexes used in this invention have the advantage that they cause practically no photochemical desensitisation of light-sensitive materials.

The following example illustrates the invention, the parts and percentages being by weight unless otherwise stated, and relationship of parts by weight to parts by volume being the same as that of the kilogram to the liter.

*Example*

4.1 parts of the dyestuff, obtained by coupling 2-amino-4-chloro-1-hydroxy-benzene with 2:3-hydroxy-naphthoic acid methoxy-propylamide are boiled for 3 hours in 200 parts water with 2.5 parts by volume of ammonia solution of 24% strength and 22 parts by volume of an 0.5 N-solution of copper tetrammine sulfate. After cooling the mixture, the coppered pigment is filtered off, washed with hot water and dried.

0.5 part of this pigment is ground in a metal-free ball mill with 0.5 part of sodium diisobutylnaphthalene sulfonate and 20 parts of water, until, practically all the pigment particles are smaller than $0.5\mu$. The contents of the mill are then flushed out with 30 parts of water, then mixed with a solution of 12 parts of gelatine in 138 parts of water, and the whole is intimately mixed. The gelatine is colored purple and has a high degree of transparency.

100 parts of this pigmented gelatine are mixed with 200 parts of a green sensitized silver bromide emulsion, and the mixture is cast on the glass plates. The light-sensitive layer is then exposed behind a stepped wedge, and the silver image is developed in a metal-hydroquinone developer and fixed. After hardening the layer in a dilute formaldehyde solution, the dyestuff of the layer is bleached in accordance with the quantity of silver present in a bath, which contains per 1000 parts by volume, 30 to 100 parts by volume of hydrochloric acid of 37% strength, 40 to 120 parts of potassium bromide, 30 to 50 parts of thiourea and 0.001 to 0.01 part of amino-hydroxyphenazine. The excess of silver is then removed in a bath which contains, per 1000 parts by volume, 100 parts of sodium chloride, 100 parts of crystallized copper sulfate and 50 parts by volume of hydrochloric acid of 37% strength, and then fixed in the usual manner. This is followed by treatment for 10 to 15 minutes in a bath consisting of an 0.05 N-solution of copper tetrammine sulfate, and then for 3 minutes in a bath of acetic acid of 5% strength. The usual washing with water is carried out after each bath and at the end. In this manner there is obtained an image of the wedge, which is the reverse of the original silver wedge, and which has a purple tint of very good fastness to light.

In the following table are given further azo-pigment metal complexes which can be used as layer dyestuffs in the manner described above. In Column I of the table are given the diazo-components, in Column II the coupling components, in Column III the metals bound in complex union, and in Column IV the tints of the color images produced with the dyestuffs:

group, and Z represents a carboxylic acid amide group.

4. A photographic layer for the silver dyestuff bleach-

| | I | II | III | IV |
|---|---|---|---|---|
| 1 | 4-chloro-2-amino-1-hydroxy-benzene | 2:3-hydroxynaphthoic acid hydroxy-propylamide | Cu | Purple. |
| 2 | do | 2:3-hydroxynaphthoic acid morpholide | Cu | Red-violet. |
| 3 | do | do | Cu | Do. |
| 4 | do | 2:3-hydroxynaphthoic acid hydroxyethyl-amide | Ni | Purple. |
| 5 | do | 2-hydroxynaphthalene-6-sulphonic acid phenylamide | Cu | Do. |
| 6 | a-Amino-1-hydroxy benzene-4-methylsulfone | 2:3-hydroxynaphthoicacid diethylamide | Cu | Do. |
| 7 | do | 2:3-hydroxynaphthoic acid morpholide | Cu | Do. |
| 8 | 1-Amino-2-hydroxynaphthalene-4-sulphonic acid di-methylamide. | 1-phenyl-3-methyl-pyrazolone-(5) | Cr 1:2 | Do. |
| 9 | 4-chloro-2-amino-1-oxybenzene | 2-hydroxynaphthalene-6-sulfonicacid methoxypropyl-amide. | Cu | Bluish-red. |
| 10 | do | 2-hydroxynaphthalene-6-sulfonic acid phenyl-amide | Co 1:2 | Do. |
| 11 | a-Amino-1-hydroxy-benzene-4-sulfonic acid phenyl-amide. | 2-hydroxynaphthaline | Cu | Do. |
| 12 | 2-Amino-1-hydroxy-benzene-4-sulfonic acid methyl-amide. | 2:3-hydroxynaphthoic acid-diethylamide | Cu | Blue-red. |
| 13 | do | 2-hydroxynaphthalene 6-sulfonic acid morpholide | Cu | Do. |
| 14 | do | 2-hydroxynaphthalene-6-benzyl-sulfone | Cu | Red. |
| 15 | 2-Amino-1-hydroxy benzene-4-methyl sulfone | 2:3-hydroxynaphthoic acid N-methyl-anilide | Cu | Purple. |
| 16 | do | 2:3-hydroxynaphthoic acid N-methyl-cyclohexylamide | Cu | Do. |
| 17 | do | 2-hydroxynaphthalene-6-benzyl-sulfone | Cu | Red. |
| 18 | do | 2-hydroxynaphthalene-6-sulfonic acid morpholide | Cu | Do. |
| 19 | 4-chloro-2-amino-1-hydroxybenzene | 1-hydroxynaphthalene-4-sulfonic acid morpholide | Cu | Purple. |
| 20 | 5-nitro-2-amino-1-hydroxybenzene | 2-aminonaphthalene-6-sulfonic acid amide | Co 1:2 | Blue. |
| 21 | 2-amino-1-hydroxy-benzene-4-benzyl sulfone | 2:3-hydroxynaphthoic acid methoxypropyl-amide | Cu | Purple. |
| 22 | 2-amino-1-hydroxybenzene-4-benzylsulfone | 2:3-hydroxynaphthoic acid diethylamide | Cu | Do. |
| 23 | 4-chloro-2-amino-1-hydroxybenzene | do | Cu | Do. |
| 24 | do | 2:3-hydroxynaphthoic acid N-hydroxyethylphenylamide | Cu | Do. |
| 25 | do | 2:3-hydroxynaphthoic acid piperidide | Cu | Do. |
| 26 | do | 2-hydroxynaphthalene | Cu | Do. |
| 27 | do | 2-hydroxynaphthoic acid N-methylanilide | Cu | Do. |
| 28 | Anthranilic acid | 1-(3'-chlorophenyl)-3-methyl-pyrazolone-(5) | Cu | Yellow. |
| 29 | 2-amino-1-hydroxy-benzene-4-carboxylic acid phenyl amide. | 2:3-hydroxynaphthoic acid diethylamide | Cu | Purple. |
| 30 | 5-chloro-2-aminobenzoic acid | do | Cu | Blue-red. |
| 31 | 4-methyl-2-amino-1-hydroxybenzene | do | Cu | Purple. |

What is claimed is:

1. A photographic layer for the silver dyestuff bleaching process, which contains silver halide and at least one complex copper compound of a monoazo pigment that corresponds to the formula

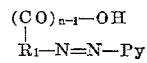

in which $R_1$ represents a radical selected from the group consisting of a benzene and a naphthalene radical to which the group

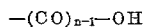

is bound in a position vicinal to the azo group, Py represents the radical of a 5-pyrazolone bound in 4-position to the azo group, and $n$ represents a whole number of at the most 2.

2. A photographic layer for the silver dyestuff bleaching process, which contains silver halide and at least one complex copper compound of a monoazo pigment that corresponds to the formula

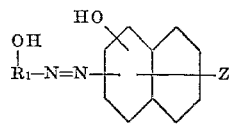

in which $R_1$ represents a benzene radical and Z represents a member selected from the group consisting of a hydrogen atom and an acid amide group, and in which the hydroxyl groups are bound in a position vicinal to the azo group.

3. A photographic layer for the silver dyestuff bleaching process, which contains silver halide and at least one complex copper compound of a monoazo pigment that corresponds to the formula

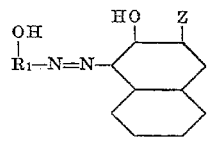

in which $R_1$ represents a benzene radical having the —OH group bound thereto in ortho-position to the azo ing process, which contains silver halide and at least one complex copper compound of a monoazo pigment that corresponds to the formula

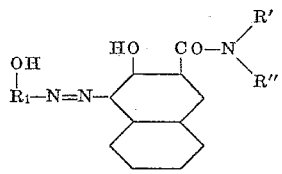

in which $R_1$ represents a benzene radical having the —OH group bound thereto in ortho-position to the azo group, R' represents a member selected from the group consisting of a hydrogen atom, an alkyl group, an aryl group and a cycloalkyl group, and R" represents a member selected from the group consisting of a hydrogen atom and an alkyl group.

5. A photographic layer for the silver dyestuff bleaching process, which contains silver halide and at least one complex copper compound of a monoazo pigment that corresponds to the formula

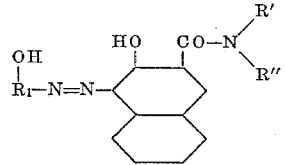

in which $R_1$ represents a benzene radical having the —OH group bound thereto in ortho-position to the azo group, and R' and R", together with the nitrogen atom, represent a heterocyclic radical.

6. A photographic layer for the silver dyestuff bleaching process, which contains silver halide and a complex copper compound of the monoazo pigment of the formula

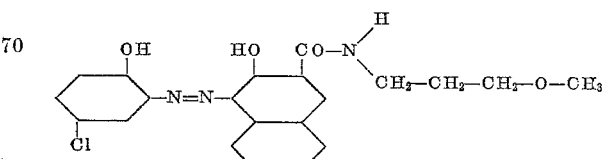

7. A photographic layer for the silver dyestuff bleaching process, which contains silver halide and a complex copper compound of the monoazo pigment of the formula

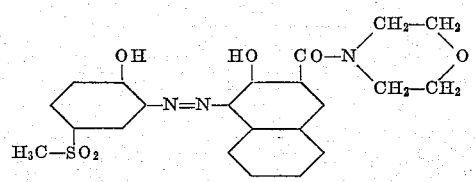

8. A photographic layer for the silver dyestuff bleaching process, which contains silver halide and a complex copper compound of the monoazo pigment of the formula

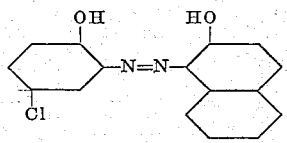

9. A photographic layer for the silver dyestuff bleaching process, which contains silver halide and a complex copper compound of the monoazo pigment of the formula

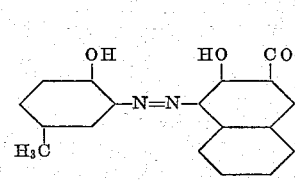

10. A photographic layer for the silver dyestuff bleaching process, which contains silver halide and at least one complex copper compound of a monoazo pigment that corresponds to the formula

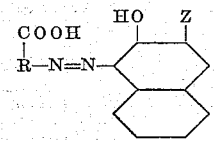

in which R represents a benzene radical having —COOH group bound thereto in ortho-position to the azo group and Z represents a carboxylic acid amide group.

11. A photographic layer for the silver dyestuff bleaching process, which contains silver halide and a complex copper compound of the monoazo pigment of the formula

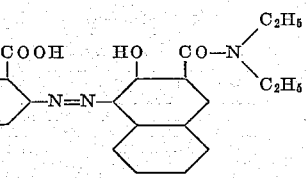

References Cited by the Examiner

UNITED STATES PATENTS

| | | | |
|---|---|---|---|
| 2,304,884 | 12/42 | Carroll | 96—99 |
| 2,970,137 | 1/61 | Whitlock | 260—151 |
| 2,991,177 | 7/61 | Roth et al. | 96—100 |
| 2,991,280 | 7/61 | Schetty et al. | 260—151 |
| 3,057,845 | 10/62 | Liechti et al. | 260—151 |
| 3,081,167 | 3/63 | Goulston et al. | 96—29 |

OTHER REFERENCES

Cornwell-Clyne: "Colour Cinematography," page 420, Chapman and Hall, 37 Essex Street, London (1951).

NORMIN G. TORCHIN, *Primary Examiner.*